Figure 1:
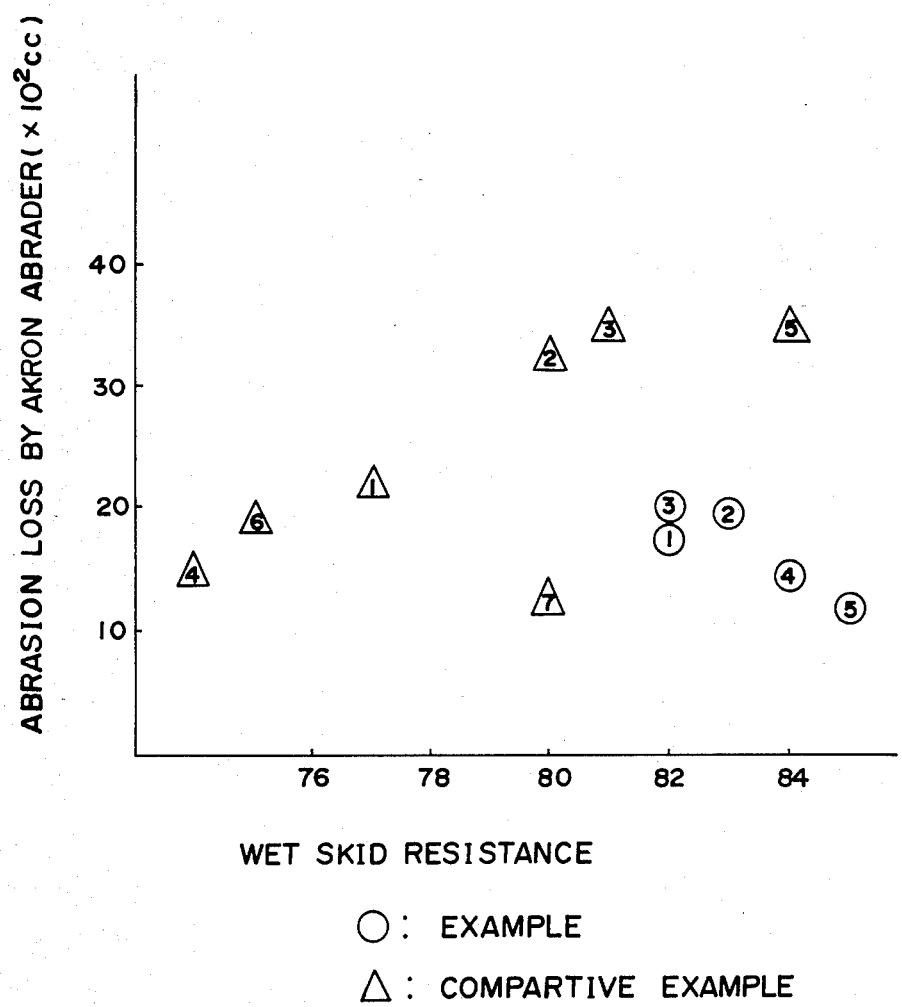

United States Patent [19]

Kawakami

[11] Patent Number: 4,510,291

[45] Date of Patent: Apr. 9, 1985

[54] RUBBER COMPOSITIONS FOR TIRE TREADS

[75] Inventor: Kinya Kawakami, Ninomiya, Japan

[73] Assignee: The Yokohama Rubber Co., Ltd., Tokyo, Japan

[21] Appl. No.: 529,962

[22] Filed: Sep. 7, 1983

[30] Foreign Application Priority Data

Sep. 9, 1982 [JP] Japan ............................. 57-155853

[51] Int. Cl.$^3$ .......................... C08L 9/00; C08L 9/06
[52] U.S. Cl. .................................. 525/237; 152/209 R
[58] Field of Search ..................... 525/237; 152/209 R

[56] References Cited

U.S. PATENT DOCUMENTS

| | | | |
|---|---|---|---|
| 4,309,318 | 1/1982 | Ahagon et al. | 525/237 |
| 4,383,085 | 5/1983 | Fujimaki et al. | 525/237 |
| 4,398,582 | 8/1983 | Yuto et al. | 525/237 |

Primary Examiner—Jacob Ziegler
Attorney, Agent, or Firm—Bucknam and Archer

[57] ABSTRACT

A rubber composition for tire treads having improved wear resistance and wet grip property without impairing rolling resistance, comprising two different specific styrene-butadiene copolymer rubbers and a specific polybutadiene rubber as the rubber ingredients in specific mixing ratios.

2 Claims, 1 Drawing Figure

RUBBER COMPOSITIONS FOR TIRE TREADS

This invention relates to a rubber composition for tire treads and more particularly to such a rubber composition for use in the production of low fuel-consuming tire treads having improved wear resistance and wet grip property while keeping rolling resistance at a desired low level, the rubber composition being characterized by including two kinds of a styrene-butadiene copolymer rubber and a polybutadiene rubber as the starting rubbers.

It is known that a blend of SBR with NR or BR, or a SBR having a low styrene content is used in substitution for SBR No. 1502 which has generally been widely used. However, said blended rubber and low styrene-containing SBR exhibit extremely decreased wet grip property thereby rendering it remarkably difficult to make rolling resistance and wet road stable running property compatible with each other in the rubber.

Further, Japanese patent application Laid-Open Gazette No. 54-62248 discloses tires prepared from, as the rubber ingredient, a SBR having a glass transition temperature (Tg) of not lower than −50° C. and having a 1,2-bonded butadiene content of 50–80% by weight and a styrene content of 20–40% by weight. However, the tires so prepared are not necessarily satisfactory in both wear resistance and rolling resistance.

Still further, Japanese patent application Laid-Open Gazette No. 56-163908 discloses pnematic tires at least the ground-contact portion of tire treads of which is prepared from a rubber composition comprising, as the rubber ingredient, a member selected from the group consisting of (1) a solution polymerization SBR having a styrene content of 5–30% by weight and a trans 1,4-bonded butadiene of up to 45% by weight, (2) an emulsion polymerization SBR having a styrene content of 30–50% by weight, (3) NR, IR and BR each having a glass transition point of up to −50° C. and (4) a SBR having a styrene content of 18–28% by weight. However, the tires so prepared are not necessarily satisfactory in wet grip property, wear resistance and rolling resistance which are three properties, desired to be well balanced together, required in the tire treads.

An object of this invention is to provide a rubber composition for use in the production of tires having not only decreased rolling resistance but also improved wear resistance and wet grip property. Such tires will finally contribute to economization of gasoline consumption of a vehicle equipped with the tires and they are used chiefly as tires for passenger cars.

The rolling resistance of tires is directly associated with the hysteresis loss of treads. The smaller the hysteresis loss at 70° C. of the cured rubber of the tires is, the lower the rolling resistance of the tires in running state is. In laboratories, it is possible to estimate the hysteresis loss of cured rubber by measuring the resilience (Lüpke rebound) thereof warmed to 70° C. The lower the resilience value so measured is, the greater the hysteresis loss is.

Wet grip property is an important property required in tires and it may be estimated by measuring the wet skid resistance of the test specimen on wet roads by the use of a portable skid tester (ASTM E303-74) in laboratories.

Wear resistance is also an important property required in tires and it may be estimated by measuring, for example, abrasion loss by Akron abrader.

As compared with SBR (No. 1712, No. 1502) which is generally used in the preparation of tire treads for passenger cars, SBR having a higher styrene content is excellent in wet grip property, but it is great in hysteresis loss and poor in wear resistance; therefore, it is unsuitable to use this SBR alone as the rubber ingredient in the preparation of tires having low rolling resistance. In contrast with SBR having a high styrene content, BR is small in hysteresis loss and excellent in wear resistance, but is very inferior in wet grip property; therefore, it is unsuitable to use BR alone for the same purpose as above.

On the other hand, medium vinyl SBR is excellent in rolling resistance and wet grip property balanced with each other as compared with a usual SBR (No. 1502, No. 1712) and it has been attempted to be used in the preparation of low fuel-consuming tires, however, the tires so prepared have low rupture resistance and considerably inferior wear resistance.

The present inventors have found that only a rubber composition comprising as the rubber ingredients the above three kinds of rubbers in a specified ratio may be used in the production of tire treads having rolling resistance, wet grip property and wear resistance which are excellently balanced with each other. This invention is based on this finding or discovery.

More particularly, this invention resides in a rubber composition for tire treads which comprises as the rubber ingredients (I) a styrene-butadiene copolymer rubber having a styrene content of 30–60% by weight (the copolymer rubber being hereinafter referred to as "SBR-1"), (II) a polybutadiene rubber having a trans 1,4-bonded butadiene content of at least 60% by weight and a glass transition temperature of from −100° C. to −50° C. (hereinafter referred to as "BR" and (III) a styrene-butadiene copolymer rubber ("SBR-2") having a styrene content of 5–30% by weight and a 1,2-bonded butadiene content of 20–60% by weight of the butadiene portion of the rubber, in such amounts that the total amount of SBR-1 and BR is 20–80% by weight of the whole of the rubber ingredients, the amount of SBR-2 is 80–20% by weight thereof and the styrene content of SBR-1 is 5–25% by weight of the total of SBR-1 and BR.

The SBR-1 used to give satisfactory wet grip property to the resulting tire treads in this invention has a styrene content of 30–60% by weight. The use of SBR having a styrene content of less than 30% by weight will not give satisfactory wet grip property, while the use of SBR having a styrene content of more than 60% by weight will increase the hysteresis loss and rolling resistance of the resulting tire treads, this being undesirable.

The BR used to give satisfactory wear resistance to the resulting tire treads in this invention has a trans 1,4-bonded butadiene content of at least 60% by weight of the butadiene portion of the BR and a glass transition temperature (Tg) of from −100° C. to −50° C., preferably from −80° C. to −50° C. The use of BR having a trans 1,4-bonded butadiene content of less than 60% by weight will give degraded wet grip property to the resulting tire treads, the use of BR having a Tg of higher than −50° C. will give aggravated rolling resistance and the use thereof having a Tg of lower than −100° C. will give extremely degraded wet grip property, these being undesirable.

Further, the SBR-2 used to give satisfactory rolling resistance to the resulting tire treads in this invention has a styrene content of 5% up to less than 30% by weight, preferably 5-25% by weight, and a 1,2-bonded butadiene content of 20-60% by weight, preferably 30-55% by weight, of the butadiene portion of the rubber. The SBR-2 may be obtained by a usual method which is a solution polymerization method using a lithium-based catalyst. The use of SBR having a styrene content of less than 5% by weight or a 1,2-bonded butadiene content of less than 20% by weight of the butadiene portion will undesirably give extremely low wet grip property, while the use of SBR having a styrene content of more than 30% by weight or a 1,2-bonded butadiene content of 60% by weight of the butadiene portion will undesirably give an increased hysteresis loss at 70° C. and an increased rolling resistance.

This invention contemplates to provide tire treads having improved wear resistance and wet grip property without aggravating the rolling resistance thereof. To this end, it is necessary to use the aforementioned three kinds of rubbers as the rubber ingredients. The rubber ingredients used in this invention comprise 20-80% by weight of the SBR-1 and BR in total and 80-20% by weight of the SBR-2 with the proviso that the styrene content of the SBR-1 is equal to 5-25% by weight of the total of the SBR-1 and BR. The use of the rubber ingredients in which the styrene content of the SBR-1 is less than 5% by weight of the total of the SBR-1 and BR will undesirably lower the wet grip property in the resulting tire treads since the BR portion increases relative to the SBR-1 portion, while in the case of the styrene content of more than 25% by weight a hysteresis loss will undesirably increase with the attendant aggravation of rolling resistance in the resulting tire treads since the SBR-1 portion increases relative to the BR portion. In addition, the use of the SBR-2 in an amount by weight of more than 80% will not give fully improved wear resistance, while the use thereof in an amount by weight of less than 20% will undesirably give unsatisfactory rolling resistance.

The rubber composition for tire treads of this invention may, if necessary, be incorporated with conventionally used additives such as carbon black, fillers, softening agents and process oils as well as with curing or vulcanizing agents such as sulphur and sulphur-containing vulcanizing agents. These vulcanizing agents may be used in combination with sulphur.

Carbon black may be used in an amount of 30-70 parts by weight per 100 parts by weight of the rubber ingredients. It is preferable that carbon black used herein have an iodine adsorption value (IA) of at least 45 mg/g and a dibutyl phthalate (DBP) adsorption value of at least 71 ml/100 g. The use of carbon black in an amount of less than 30 parts by weight will give decreased rupture resistance and wear resistance to the resulting tire treads, the use thereof in an amount of more than 70 parts by weight will tend to give increased hysteresis loss and rolling resistance. Further, the use of carbon black having an IA of less than 45 mg/g or a DBP adsorption value of less than 71 ml/100 g will not give satisfactory wear resistance to the resulting tire treads.

This invention will be better understood by the following Examples and Comparative Examples by reference to the accompanying drawing in which FIG. 1 shows the relationship between abrasion loss by Akron abrader of the vulcanizate of Comparative Examples 1-7 and Examples 1-5 and the wet skid resistance of the vulcanizate of the same Comparative Examples and Examples.

EXAMPLES 1-5 AND COMPARATIVE EXAMPLES 1-7

Rubber compositions were prepared by mixing together SBR-1, SBR-2 and BR respectively having their structures as shown in Table 1, in various ratios as shown in Table 2, in a small-sized closed type mixer. The thus prepared rubber compositions were each vulcanized at 160° C. for 20 minutes to obtain a vulcanized rubber which was then measured for resilience, wet skid resistance, wear resistance, 100% tensile stress, hardness, tensile strength and elongation. The 100% tensile stress, tensile strength and elongation were measured in accordance with JIS K6301, the hardness was measured by the use of a dumbbell puncher in accordance with JIS K6301 and the resilience was measured at 70° C. by a test for Lüpke rebound (resilience). The wet skid resistance was measured in the atmosphere at 25° C. by a British portable skid tester using as the road surface an outdoor type B safety walk (produced by 3M Company) wetted with distilled water. The wear resistance was measured by Akron abrader.

The results are as indicated in Table 2 and, in addition, the relationship between abrasion loss by Akron abrader and the wet skid resistance is as shown in FIG. 1. In Table 2, the numerals to indicate the amounts of materials used in the rubber compositions are all by parts by weight and the parenthesized numerals regarding SBR-1 (−A to −D) are ratios in wt. % between the styrene content of SBR-1 used and the total of SBR-1 and BR used.

TABLE 1

| Rubber ingredient | Styrene content (wt. %) | Butadiene portion[1] (wt. % based on butadine portion) | | | Mooney viscosity $(ML_{1+4'})$ 100° C. | Glass[2] transition temperature (Tg) (°C.) |
| --- | --- | --- | --- | --- | --- | --- |
| | | Cis | Trans | Vinyl | | |
| SBR-1-A | 35 | 15 | 67 | 18 | 35 | −38 |
| SBR-1-B | 35 | 15 | 67 | 18 | 117 | −37.5 |
| SBR-1-C | 50 | 12 | 68 | 20 | 40 | −17 |
| SBR-1-D | 50 | 12 | 68 | 20 | 119 | −17.5 |
| BR-A | — | 12 | 70 | 18 | 50 | −72 |
| BR-B[3] | — | 98 | 1 | 1 | 44 | −108 |
| SBR-2-E | 18 | 19 | 27 | 54 | 60 | −46 |
| SBR-2-F | 15 | 21 | 31 | 48 | 60 | −51 |
| SBR-2-G | 25 | 24 | 40 | 36 | 56 | −49 |
| SBR #1502[4] | 23.5 | 12 | 69 | 19 | 51 | −60 |

[1]Measured by infrared-ray spectrophotometer and calculated in accordance with Hampton's method.
[2]Measured by differential scanning calorimeter (DSC) in accordance with ASTM D3418.
[3]Nipol 1220 (produced by Nippon Zeon Co., Ltd.)
[4]Nipol 1502 (produced by Nippon Zeon Co., Ltd.)

TABLE 2

| No. | Example and Comparative Example | | | | | | | | | | | |
| --- | --- | --- | --- | --- | --- | --- | --- | --- | --- | --- | --- | --- |
| | Comparative Example | | | | | | | Example | | | | |
| | 1 | 2 | 3 | 4 | 5 | 6 | 7 | 1 | 2 | 3 | 4 | 5 |
| Composition (Parts by weight) | | | | | | | | | | | | |

TABLE 2-continued

| No. | Comparative Example | | | | | | | Example | | | | |
|---|---|---|---|---|---|---|---|---|---|---|---|---|
| | 1 | 2 | 3 | 4 | 5 | 6 | 7 | 1 | 2 | 3 | 4 | 5 |
| SBR-1-A | | | | | | | 33 (23.1) | 33 (23.1) | | 17 (23.8) | | |
| SBR-1-B | | | | | | | | | | | 50 (23.3) | |
| SBR-1-C | | | | | | 100 (50.0) | 47 (23.5) | | | | | 35 (23.3) |
| SBR-1-D | | | | | | | | | 12 (24.0) | | | |
| BR-A | | | | 100 | | | 53 | 17 | 13 | 8 | 25 | 40 |
| BR-B | | | | | | 17 | | | | | | |
| SBR-2-E | | | | | | | | | | 75 | 25 | |
| SBR-2-F | | | 100 | | | | | | 75 | | | 25 |
| SBR-2-G | | 100 | | | | 50 | | 50 | | | | 25 |
| SBR #1502 | 100 | | | | | | | | | | | |
| Carbon black (N 339) | 50 | | | | | | | | | | | 65 |
| Aromatic oil | 5 | → | → | → | → | → | → | → | → | → | → | 25 |
| Stearic acid | 1.5 | | | | | | | | | | | |
| Zinc oxide | 3 | | | | | | | | | | | |
| Anti-oxidant*5 | 1 | → | → | → | → | → | → | → | → | → | → | → |
| Vulcanization accelerator*6 (OBS) | 1.0 | | | | | | | | | | | |
| Sulphur | 1.75 | | | | | | | | | | | |
| Properties of vulcanizate | | | | | | | | | | | | |
| 100% tensile stress (Kg/cm²) | 28 | 14 | 18 | 15 | 41 | 20 | 34 | 22 | 25 | 20 | 30 | 30 |
| Hardness (JIS A) (degree) | 68 | 60 | 61 | 64 | 72 | 64 | 70 | 65 | 63 | 63 | 67 | 69 |
| Resilience (Lupke rebound) (%), 70° C. | 61 | 65 | 64 | 63 | 52 | 64 | 58 | 63 | 63 | 64 | 62 | 61 |
| Wet skid resistance | 77 | 80 | 81 | 74 | 84 | 75 | 80 | 82 | 83 | 82 | 84 | 85 |
| Abrasion loss (× 10² cc) | 22 | 33 | 35 | 15 | 35 | 19 | 13 | 18 | 20 | 20 | 15 | 12 |
| Tensile strength (Kg/cm²) | 265 | 223 | 201 | 231 | 288 | 231 | 281 | 248 | 251 | 236 | 268 | 273 |
| Elongation (%) | 450 | 480 | 450 | 490 | 390 | 460 | 410 | 450 | 450 | 460 | 420 | 420 |

*5N—phenyl-N'—1,3-dimethylbutyl-p-phenylenediamine
*6N—oxydiethylenebenzothiazolylsulfenamide It is seen from Table 2 that as compared with the use of the rubber composition, which is a conventional basic one, of Comparative Example 1, the use of the rubber compositions of Comparative Examples 2-3 including SBR-2 alone as the rubber ingredient will give improved resilience and wet skid resistance but it will give remarkably decreased wear resistance to the resulting tire treads. The use of the rubber composition of Comparative Example 4 including BR alone as the rubber ingredient will give improved wear resistance but it will give remarkably lowered wet skid resistance. The use of the rubber composition of Comparative Example 5 including SBR-1 alone as the rubber ingredient will give improved wet skid resistance and, to the contrary, lowered wear resistance. The use of the rubber composition of Comparative Example 6 including SBR-1, BR and SBR-2 as the rubber ingredients will give remarkably decreased wet skid resistance because of the use of BR having a low trans 1,4-bonded butadiene content and a low Tg. The use of the rubber composition of Comparative Example 7 including SBR-1 and BR in combination as the rubber ingredients will give lowered resilience.

In contrast, the use of each of the rubber compositions of Examples 1-5 respectively including as the rubber ingredients SBR-1, SBR-2 and BR having a trans 1,4-bonded butadiene content of at least 60% by weight and a Tg of from −100° C. to −50° C. will give improved resilience, wet skid resistance and wear resistance without impairing other properties such as 100% tensile stress and tensile strength as compared with the rubber composition of Comparative Example 1.

It is also seen from FIG. 1 that the use of the rubber compositions of Examples 1-5 will give excellent wear resistance and wet skid resistance to the resulting tire treads as compared with the use of those of Comparative Examples 1-7.

As mentioned above, the rubber compositions of this invention which comprise not only two kinds of specific SBR's but also specific BR as the rubber ingredients may be used in the production of tires having improved wet grip property and wear resistance without impairing rolling resistance. The tires so produced are advantageous in that they have improved running stability and longer service life as compared with those produced by conventional techniques.

What is claimed is:

1. A rubber composition for tire treads which comprises as the rubber ingredients (I) a styrene-butadiene copolymer rubber having a styrene content of 30–60% by weight, (II) a polybutadiene rubber having a trans 1,4-bonded butadiene content of at least 60% by weight and a glass transition temperature of from −100° C. to −50° C. and (III) a styrene-butadiene copolymer rubber having a styrene content of 5–25% by weight and a 1,2-bonded butadiene content of 20–60% by weight of the butadiene portion of the rubber (III), in such amounts that the styrene-butadiene copolymer rubber (I) and polybutadiene rubber (II) are present in a total amount of 20–80% by weight of the whole of the rubber ingredients, the styrene-butadiene copolymer rubber (III) is present in an amount of 80–20% by weight of the whole of the rubber ingredients and the styrene content of the rubber (I) is equal to 5–25% by weight of the total of the rubbers (I) and (II).

2. The rubber composition according to claim 1, wherein the 1,2-bonded butadiene in said (III) is 30–55% by weight.

* * * * *